United States Patent [19]

Williams et al.

[11] Patent Number: 5,078,660
[45] Date of Patent: Jan. 7, 1992

[54] TRANSFER CASE LIMITED SLIP PLANETARY DIFFERENTIAL

[75] Inventors: Randolph C. Williams, Weedsport; Richard E. Eastman, Central Square; S. K. Varma, Syracuse, all of N.Y.

[73] Assignee: New Venture Gear, Inc., Troy, Mich.

[21] Appl. No.: 690,085

[22] Filed: Apr. 23, 1991

[51] Int. Cl.[5] .............................................. F16H 37/08
[52] U.S. Cl. ...................................... 475/84; 180/250; 475/221; 475/252
[58] Field of Search ................. 475/84, 221, 248, 249, 475/250, 252; 180/247–250

[56] References Cited

U.S. PATENT DOCUMENTS

| | | | |
|---|---|---|---|
| 4,677,873 | 7/1987 | Eastman et al. | 475/252 X |
| 4,722,246 | 2/1988 | Gaus et al. | 475/252 X |
| 4,779,699 | 10/1988 | Hatano | 180/248 |
| 4,788,886 | 12/1988 | Nussbaumer et al. | 180/247 X |
| 4,907,473 | 3/1990 | Fujitani et al. | 475/250 |

*Primary Examiner*—Dwight Diehl
*Attorney, Agent, or Firm*—Harness, Dickey & Pierce

[57] ABSTRACT

A transfer case for a four wheel drive vehicle providing a central shaft defining a first output concentrically surrounded by a forward high/low drive range gear set and an aft dual planetary inter-axle differential gear set. A range clutch collar is disposed between the gear sets for selectively providing four wheel drive low range, neutral, and full-time four wheel drive high range. Likewise, a mode sleeve is disposed between the gear sets for selectively locking the differential gear set when the vehicle is shifted into its four wheel low range. Inner and outer relatively rotational drum housings surrounded the aft dual planetary differential gear set for defining an annular viscous fluid coupling chamber therebetween. The inner drum is formed with internal annulus gear teeth meshed with a portion of the dual planetary gear set for rotation with the first output shaft while the outer drum is interconnected to a second output for providing full-time four wheel drive differentiation with limited slip between the first and second outputs.

8 Claims, 3 Drawing Sheets

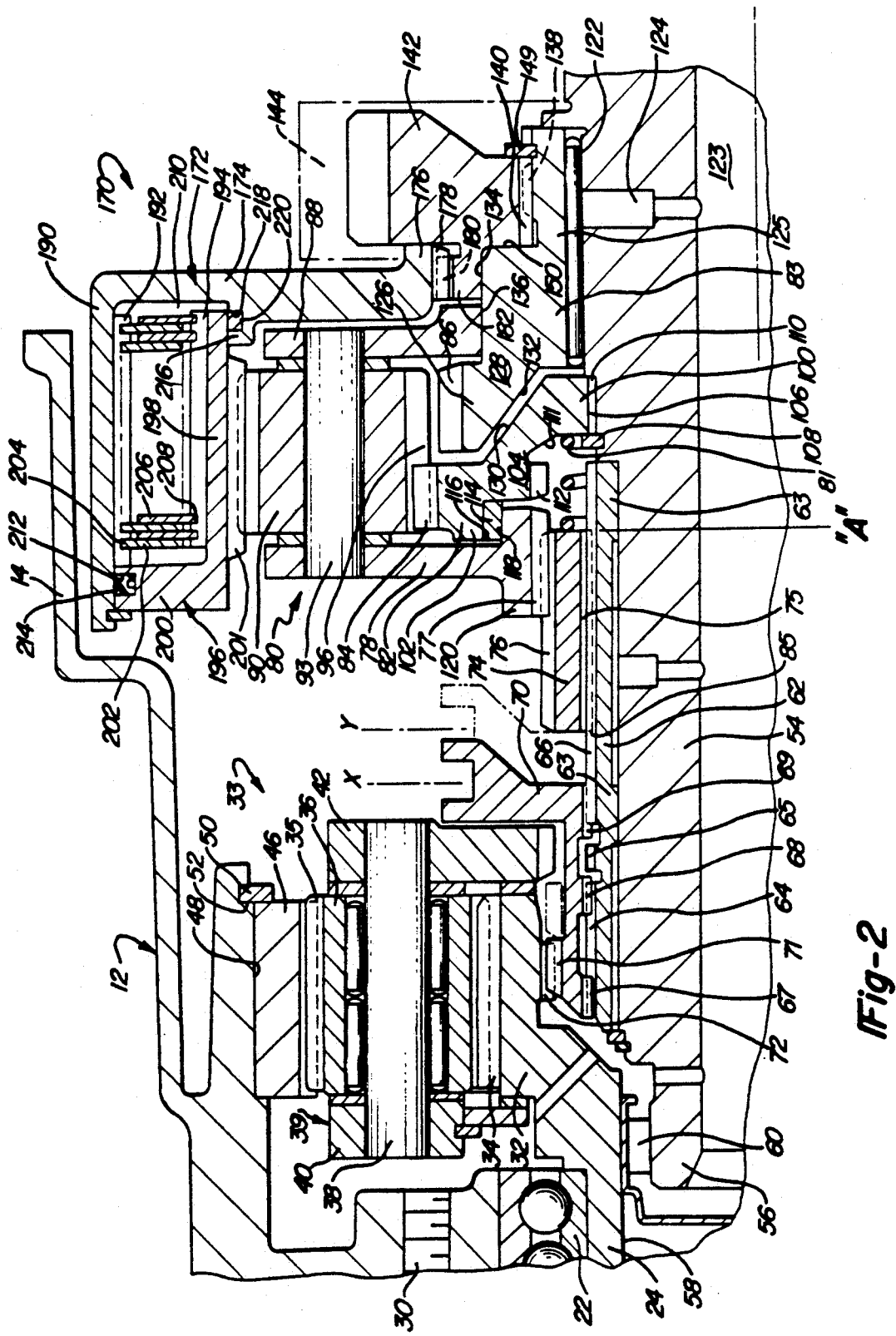

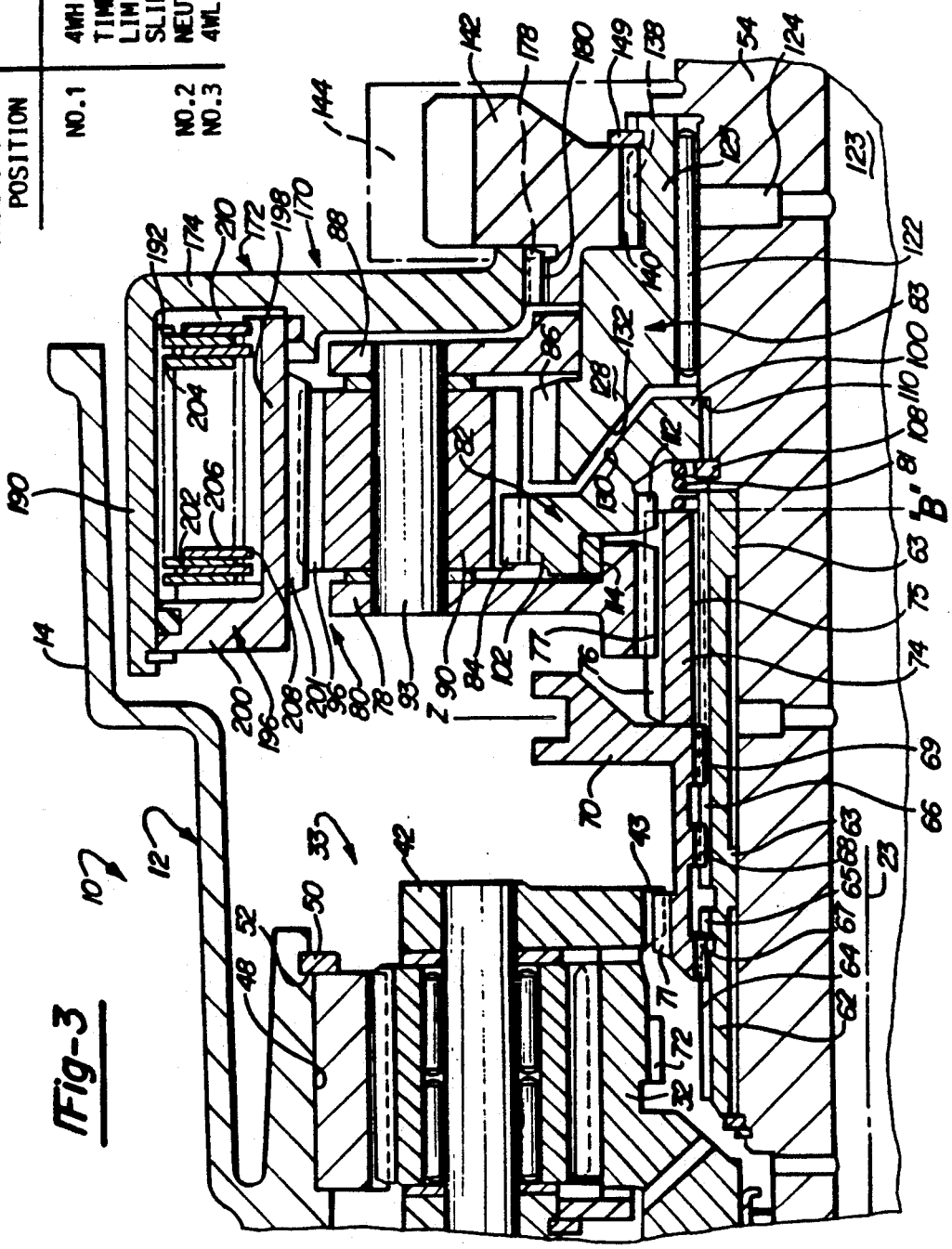

TRANSFER CASE LIMITED SLIP PLANETARY DIFFERENTIAL

BACKGROUND OF THE INVENTION

This invention relates generally to vehicle transfer cases and, more particularly, to a transfer case providing full-time four wheel drive with limited slip between the front and rear drivelines.

Due to the recent growth in popularity of four wheel drive vehicles, part-time and full-time transfer cases have found increased application in passenger, sport and light duty vehicles. Many transfer cases include a differential mechanism for splitting torque between front and rear drivelines. For example, U.S. Pat. No. 4,677,873 issued to Eastman, entitled Transfer Case With Inter-Axle Dual-Planetary Differential, discloses a transfer case adapted for a two/four wheel drive vehicle which provides for an unequal torque split between the front and rear wheels during full-time four wheel drive operation. A dual-planetary differential gear set is shifted by means of a mode clutch to provide either four wheel drive with full-time differentiation between the front and rear wheels or a part-time four wheel drive operating mode wherein the dual planetary differential gear set is in a locked-up condition.

SUMMARY OF THE INVENTION

It is an object of the present invention to provide a transfer case for a full-time four wheel drive vehicle having an improved inter-axle dual-planetary differential which allows differentiation between the vehicle's front and rear drive-lines while limiting slip therebetween. Drive-line slip is limited by incorporation of a viscous coupling uniquely arranged within the transfer case in a compact and simplified manner.

It is another object of the present invention to provide an improved transfer case as set forth above wherein the viscous coupling provides a viscous dampening effect between the transfer case single input shaft and each of the transfer case output shafts drivingly connected to the vehicle's rear and front axles, respectively.

The present invention achieves these objectives in an improved inter-axle dual-planetary differential gear set for use in a full-time four wheel drive transfer case which functions to divide the input torque, supplied by an input shaft from a vehicle transmission to front and rear axle drive shafts, in a manner proportional to the number of teeth on forward and aft sun gears of different diameters. The forward sun gear is fixed to the rear axle output shaft while the aft sun gear is journally supported on the rear axle output shaft. Drive torque from the aft sun gear is transmitted to a chain sproket having a chain drivingly connected to the front axle via a front axle output shaft. A first set of full-length planet gears mesh with the forward larger diameter sun gear and an annulus gear while a second set of half-length planet gears are each intermeshed with both the aft smaller diameter sun gear and an associated one of the full-length planet gears.

Portions of inner and outer drum housings are concentrically arranged about the dual-planetary differential gear set for relative rotation while defining a sealed viscous fluid chamber therebetween. The annulus gear, formed on the interior of the inner drum housing, has its teeth in mesh with the outer full-length planet gears. The inner drum housing also is formed with exterior splines meshingly engaged with a first set of clutch plates of the viscous coupling. The first set of clutch plates intermittently overlap a second set of clutch plates with the second set of clutch plates meshingly engaged with interior splines formed on the outer drum housing. Thus, the inner drum housing and the first set of clutch plates rotate with the transfer case central output shaft and, in turn, the rear axle of the vehicle via the forward sun gear and the full-length planet gears. The outer drum housing and the aft sun gear are each splined to the chain sprocket gear such that the second set of clutch plates rotate with the front axle via the half-length planet gears and the aft sun gear.

A mode clutch sleeve, which is slidably mounted on the central output shaft, is axially biased forwardly to a predetermined stop position by a mode return spring. In the stop position, the exterior splines of the mode clutch sleeve only engage the interior splines of the dual-planetary carrier such that the dual-planetary differential gear set provides full-time inter-axle differentiation. A range clutch sleeve is slidably mounted on the central output shaft and is adapted to be shifted to a rearward "Neutral" position from a "High-Range" position. In its "Neutral" position, an aft end of the range clutch sleeve abuts a forward end of the mode clutch sleeve with the mode sleeve biased to its full-time four wheel drive position.

Upon the range clutch sleeve being shifted rearwardly from its "Neutral" position to a "Low-Range" four wheel drive position, the range clutch sleeve pushes the mode clutch sleeve rearwardly against the biasing force of the mode return spring to a differential "lock-out" position. In the "lock-out" position, the mode clutch sleeve external splines engage the spline teeth of both the forward carrier ring and the forward sun gear of the dual-planetary differential gear set whereby the dual planetary carrier rings and the forward sun gear are locked against relative rotation.

BRIEF DESCRIPTION OF THE DRAWINGS

These and other objects and advantages of the present invention will be more apparent from the following description and the accompanying drawings in which:

FIG. 2 is an enlarged fragmentary sectional view of the transfer case of FIG. 1 shown in its full-time four wheel "High" drive position;

FIG. 3 is a view similar to FIG. 2 showing the transfer case shifted into its full-time four wheel drive "Low" position; and FIG. 4 is a chart depicting the three operating states which may be selected by the vehicle operator upon selective movement of the range clutch sleeve.

DETAILED DESCRIPTION OF THE PREFERRED EMBODIMENT

Figure 1:
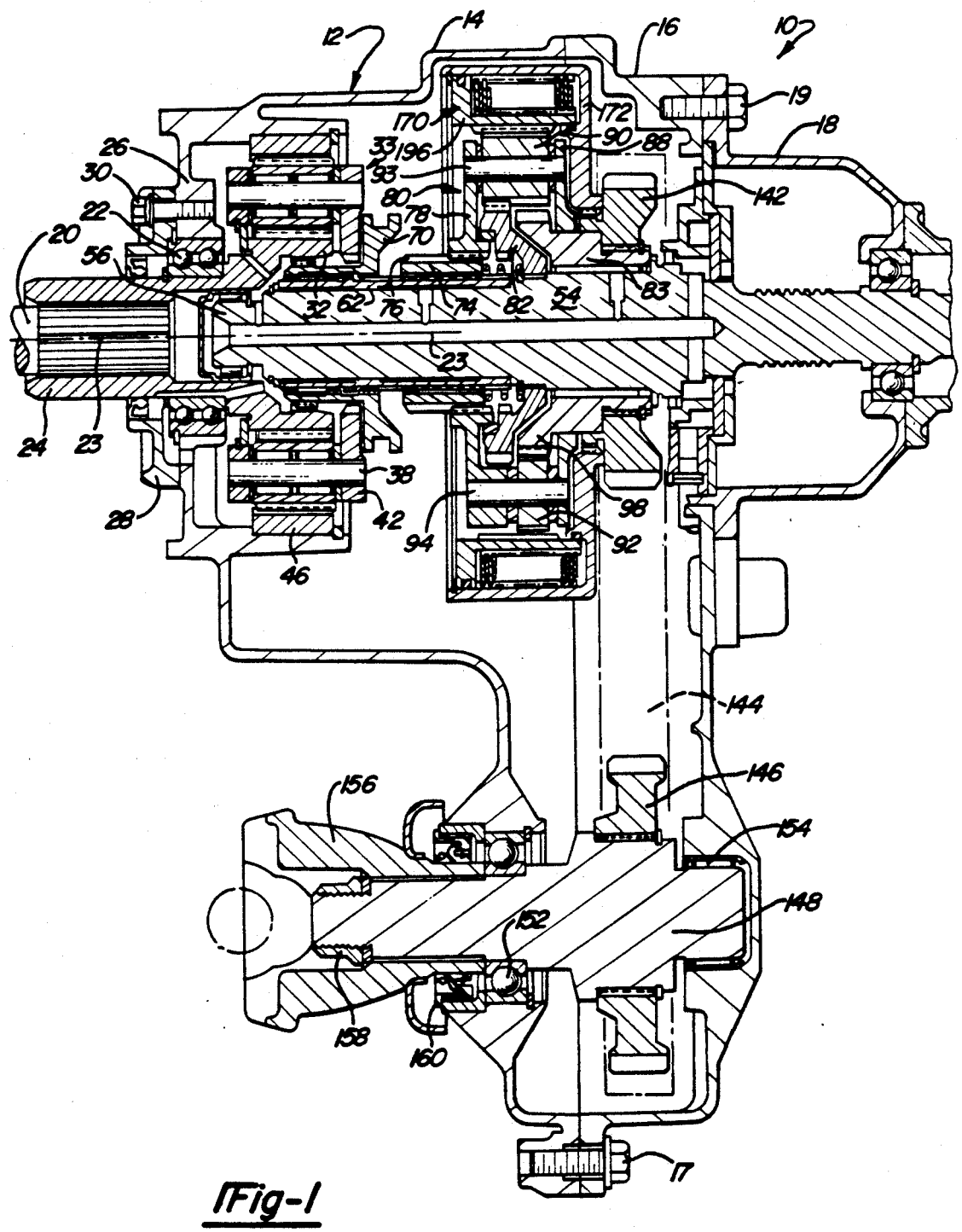
FIG. 1 is a sectional view of an exemplary vehicle transfer case showing the inter-axle dual-planetary differential gear set and viscous coupling of the present invention.

In general, the present invention discloses a novel dual-planetary differential gear set and viscous coupling arrangement for a full-time transfer case. More particularly, the present invention is a modified version of the transfer case disclosed in the Assignees U.S. Pat. No. 4,677,873 incorporating limited slip control and having only three (3) operating position for full-time four wheel drive vehicle applications. However, it will be appreciated that the teachings of the present invention can be readily incorporated into other suitable transfer cases.

With particular reference now to the drawings, there is shown in FIG. 1, a full-time four wheel drive transfer case 10 for use in four wheel drive motor vehicles. In general, transfer case 10 is adapted for conventional interconnection to a drivetrain (engine and transmission) for driving front and rear ground engaging wheels supported on front and rear axles, respectively. Transfer case 10 includes a housing assembly 12 formed by front and back housing sections 14 and 16, respectively, which are suitably connected by a plurality of threaded bolts, only one of which is shown at 17. A rear shaft bearing support housing 18 is shown suitably connected to back housing section 16 by threaded bolts such as by bolt 19. Front housing section 14 is adapted to receive a vehicle transmission output shaft 20 for rotation about a central longitudinal axis 23. An input stub shaft 24, aligned on central axis 23, has internal splines engaged with external splines on transmission output shaft 20. Stub shaft 24 is shown rotatably supported in a hub portion 26 of front housing section 14 by a ball-bearing assembly 22 and sealingly enclosed by collar member 28 secured by bolts 30.

With reference to FIG. 2 input stub shaft 24 has an input sun gear 32 operatively associated with a forward helical planetary gear set reduction assembly 33. More specifically, sun gear 32 is formed integrally with the inner end of stub shaft 24. Helical teeth 34 of input sun gear 32 are meshed with teeth 35 of a plurality of helical planet gears one of which is shown at 36. Each planet gear 36 is rotatably journaled on a pin 38 supported in a planetary gear set carrier 39. Planetary carrier 39 includes fore and aft carrier ring members 40 and 42, suitably interconnected as by machine bolts (not shown). It will be noted that aft carrier member 42 is formed with a central bore having internal splines 43 concentrically arranged about the longitudinal-central axis 23 of input stub shaft 24. Helical planet gears 36 mesh with a helical annulus gear 46 suitably mounted in a splined press-fit manner to an inner annular surface 48 formed in front housing section 14. Annulus gear 46 is also retained against rearward movement by a snap ring 50 received in an internal annular notch 52.

With continued reference to the drawings, a first or central output shaft 54, aligned concentrically with central longitudinal axis 23, has a pilot end portion 56 journally supported in an input shaft axial counterbore 58 by roller bearings 60. Central output shaft 54 is concentrically surrounded by an intermediate sleeve 62 journally supported thereon by a pair of circumferential internal bearing surfaces 63 for relative rotation therewith. Intermediate sleeve 62 has external longitudinally spaced sets of splines 64, 65, and 66 which are selectively engageable with internal sets of splines 67, 68, and 69 formed on axially shiftable range clutch collar 70 shown to concentrically surround the forward end of intermediate sleeve 62. Range clutch collar 70 has external splines 71 for selective slidable engagement with internal splines 72 on sun gear 32 and internal splines 43 on aft carrier member 42. As best seen in FIG. 2, range clutch collar 70 is shown positioned by suitable shifts means in an extreme leftward full-time four wheel "high-range" operating position as indicated by construction line "X". With range collar 70 in its "X" operating position, engine torque or power flows from input stub shaft 24 and integral sun gear 32 to intermediate sleeve 62 via engaged sets of splines 72, 71 and 67-68, 64.

An axially movable mode clutch collar 74 concentrically surrounds the aft end of intermediate sleeve 62. Mode clutch collar 74 is shown in FIGS. 1 and 2 to be resiliently biased toward an extreme leftward, differential "unlocked" operating position as indicated by solid construction line "A" by virtue of collar internal splines 75 meshingly engaging intermediate sleeve external splines 66. Further, with mode clutch collar 74 biased to its extreme leftward "A" operating position, its external splines 76 engage internal splines 77 formed on a concentric opening of a first or forward carrier ring 78 which is associated with a torque-splitting dual-planetary differential gear set 80.

In the disclosed form, mode clutch collar 74 is biased to its "A" operating position by a compression spring 81 concentrically disposed on center output shaft 54. It will be noted that in the leftward "A" stop position, a forward end of mode collar 74 engages a stop surface, generally shown at 85, provided by conventional machining of intermediate sleeve external splines 66.

Dual-planetary differential gear set 80 includes a forward sun gear 82 and an aft sun gear 83 which are positioned in a concentrically surrounding axially juxtaposed manner on central output shaft 54 relative to central axis 23. Forward sun gear 82 has its gear teeth 84 located at a first predetermined radial distance from central axis 23. Likewise, aft sun gear 83 has its gear teeth 86 located at a second predetermined lesser radial distance from axis 23.

Dual-planetary differential gear set 80 has a carrier assembly having a forward carrier ring 78 and an aft carrier ring 88. The carrier rings, interconnected and secured by suitable means such as bolts (not shown), rotatably support a first set of full-length planet gears 90 and second set of half-length planet gears 92 by means of their associated pins 93 and 94, respectively. The first set of full-length planet gears 90 extend longitudinally along substantially the full axial extent between forward and aft carrier rings 78 and 88, respectively. The second set of half-length planet gears 92 extend longitudinally approximately one-half the axial extent between forward and aft carrier rings 78 and 88, respectively. It will be noted that both full-length planet gears 90 and half-length planet gears 92 have identical diameters and cross sections. Thus, the equal diameter planet gears 90 and 92 are formed with the same number of gear teeth, (i.e. fourteen gear teeth in the preferred embodiment).

As explained in the U.S. Pat. No. 4,677,873 pins 93 of full-length planet gears 90 have their pin axis located at a first radius $R_1$, a predetermined greater radial distance outwardly from axis 23 than second radius $R_2$ for half-length planet gear pins 94. Thus, teeth 84 of forward sun gear 82 engage only gear teeth 96 of full-length planet gears 90 while aft sun gear teeth 86 engage only gear teeth 98 of half-length planet gears 92 as best seen in FIG. 1.

With reference to FIG. 2, forward sun gear 82 is shown to have radial extending hub portion 100 axially offset rearwardly from an outer radially extending rim portion 102 by means of a frusto-conical sectioned web portion 104. The first sun gear hub portion 100 has internal splines 106 engaged with external splines formed on central output shaft 54. Hub portion 100 is axially located on central output shaft 54 between a retention snap ring 108 engaging one face of hub portion 100 and a radial stop shoulder 110 engaging the opposite aft face of hub portion 100.

It will be noted that left or forward sun gear 82 has its web portion 104 forward facing surface formed with an annular recess 111 formed with internal spline teeth 112. Spline teeth 112 have every other tooth eliminated to provide ease of shifting in a manner to be explained. Further, an annular bearing or bushing ring 114 is positioned intermediate an internal annular shoulder 116 notched-out of forward sun gear rim portion 102 and an external annular shoulder 118 of left carrier ring 78 for journally aligning first sun gear 82 thereon. Dual-planetary forward carrier ring 78 has an axially extending cylindrical flange portion 120 defining a concentric circular opening having internal splines 77 formed thereon which are axially aligned with forward sun gear internal spline teeth 112. As seen, forward carrier ring external annular shoulder 118 is also formed on flange portion 120.

Right or aft sun gear 83 is journally supported on central output shaft 54 for relative rotation thereto by suitable bearing means. In the disclosed embodiment, needle or roller bearings 122 are supplied with lubrication from an axial bore 123 by means of radial oil passage 124. FIGS. 2 and 3 show aft sun gear 83 formed with an inner axially extending hub portion 125 offset rearwardly from an outer toothed rim portion 126 by means of a frusto-conical sectioned web portion 128. It will be noted that web portions 104 and 128 define complementary juxtaposed nested convex 130 and concave 132 frusto-conical surfaces, respectively. As a result, forward sun gear web portion 104 and its associated hub portion 100 partially nest within aft sun gear concave frusto-conical portion, defined by surface 132, thus achieving a compact space-saving arrangement. Aft sun gear web portion 128 has a notched-out annular external shoulder 134 formed therein which is adapted to concentrically receive and journally support aft carrier ring 88 by means of its circular opening 136.

Axial hub portion 125 of aft sun gear 83 has external splines 138 which engage internal splines 140 of a drive sprocket 142. Thus, aft sun gear hub portion 125 carries drive sprocket 142 for rotation therewith. A chain 144 driven by drive sprocket 142, in turn, rotates a driven sprocket 146 which drives a front or second output shaft 148. Drive sprocket 142 is fixed on hub portion 125 between snap ring 149 and radial annular shoulder 150 formed on aft sun gear web portion 128.

Front output shaft 148 is supported and retained in transfer case 10 by a front bearing 152 supported in front housing member 14 and a rear bearing assembly 154 located in rear housing member 16. An output shaft yoke 156 is secured to the forward end of front output shaft 148 with a yoke nut 158 with output shaft yoke 156 being sealed by an oil seal 160. Front output shaft yoke 156 extends forwardly and is adapted for connecting to a drive shaft to drive the front axle of a vehicle.

As best seen with reference to FIGS. 2 and 3, a limited slip viscous coupling unit 170 is shown uniquely incorporated with dual-planetary differential gear set 80 to limit driveline slip during full-time four wheel "High-range" operation. Viscous coupling unit 170 includes an outer drum housing 172 having a radially extending wall portion 174 provided with an inner rearwardly extending hub 176 formed with internal splines 178. Splines 178 meshingly engage external splines 180 formed on an annular flange 182 integral with drive sprocket 142. It will be noted that an inner cylindrical surface of sprocket flange 182 is journally supported on aft sun gear shoulder 134 for concentric rotation about central axis 23.

Outer drum housing 172 has an axial forwardly extending cylindrical wall portion 190 with its inner surface formed with internal splines 192 which are axially aligned with external splines 194 formed on an inner drum housing 196. Inner drum housing 196 is generally right angled in cross-section for defining a concentrically-arranged ring gear portion 198 and a radially outwardly extending flange portion 200. Inner drum housing ring portion 198 has its inner surface formed with internal annulus gear teeth 201 which meshingly engage teeth 96 of each of the full-length set of planetary gears 90. Outer drum housing internal splines 192 support a plurality of first viscous coupling clutch plates 202 which are annular ring-shaped members having splines 204 formed at their outer periphery for drivingly engaging internal splines 192. A plurality of second viscous coupling clutch plates 206 have spline teeth 208 at their inner periphery for drivingly engaging external splines 194 of inner drum housing 196. First clutch plates 202 are interleaved and axially moveable relative to second clutch plates 206 both of which are confined in a viscous fluid chamber 210.

Inner drum housing radial flange 200 terminates in an annular notch 212 provided for receiving an oil seal 214 therein to produce fluid-tight sealed engagement with an inner surface of outer drum wall portion 190. In addition, radial wall portion 174 of outer drum housing 172 includes an intermediate forwardly projecting axial flange portion 216 on which an annular notch 218 is formed for receiving an oil seal 220 therein for fluid-tight sealed engagement with an inner surface of inner drum housing 196. In this manner, viscous fluid chamber 210 is sealed as a fluid-tight pressurizable chamber. As is known, viscous chamber 210 is filled with a suitable quantity and type of viscous fluid for limiting slip in a manner known in the art.

With reference to the three shift positions designated in FIG. 4, operation of transfer case 10 will now be described. Operating state No. 1 is the "high-range differential unlocked" full-time four wheel drive mode wherein range clutch collar 70 is located in the leftward "X" position with mode clutch collar 74 biased to the leftward "A" position. As noted, torque or power flow is transferred from input shaft integral sun gear 32 to intermediate sleeve 62 via engaged splines 72, 71 and 67-68, 64. This high-range drive torque is then transferred from intermediate sleeve 62 to mode collar 74 via engagement of splines 66 and 75. In the "A" position, mode clutch collar spline teeth 76 engage only internal splines 77 of forward carrier ring 78. As a result, drive torque from intermediate sleeve 62 and mode clutch collar 74 is split between forward sun gear 82 and aft sun gear 83. That is, forward sun gear 82 drives the vehicle's rear wheels via the first or central output shaft 54 while aft sun gear 83 drives drive sprocket 142 and chain 144 which, in turn, drive the vehicle's front wheels via the second or offset output shaft 148. Thus, in the No. 1 operating state shown in FIG. 2, dual-planetary gear set 80 provides torque split differentiation while viscous coupling unit 170 limits slippage with a viscous dampening effect between first output shaft 54 and second output shaft 148.

As explained in the U.S. Pat. No. 4,677,873, dual-planetary differential gear set 80 divides the torque from input shaft 24 between rear axle output shaft 54 and front axle output shaft 148 in a ratio proportional to the number of teeth formed on forward sun gear 82 and aft sun gear 83. Since inner drum ring gear portion 198 is splined to viscous coupling plates 206 of viscous coupling unit 170, plates 206 rotate with forward sun gear 82 and thus with central output shaft 54 driving the rear wheels. Furthermore, since outer clutch plates 202, interleaved with inner clutch plates 206, are coupled with internal splines 192 on outer drum housing cylindrical wall portion 190, outer drum housing 172 is rotatably driven thereby. Moreover, outer drum housing 172 is positively connected to drive sprocket 142, via splines 178 and 180 for rotation with second output shaft 148 for driving, or being driven by, the front axle. Thus, viscous coupling unit 170 is incorporated with dual-planetary differential gear set 80 to provide limited slip inter-axle differentiation between first and second drive shafts 54 and 148, respectively, during full-time high-range four wheel drive operation of the vehicle.

Upon transfer case 10 being placed in its No. 2 "Neutral" operating state (with range clutch sleeve 70 moved rightwardly to the "Y" position and mode collar 74 remaining in the "A" position) sun gear splines 72 are disengaged from range clutch collar splines 71 whereby no input power is transferred from input shaft 24 to intermediate sleeve 62 and thus no output torque is delivered to either first or second output shafts 54 and 148, respectively. In the "neutral" state, viscous coupling unit 170 permits front and rear axle differentiation when the vehicle is being towed.

With reference to FIG. 3, operating state No. 3 is shown. More particularly, upon range clutch sleeve 70 being shifted rightwardly from its high-range "X" position past its neutral position "Y" to its low-range position "Z," mode clutch collar 74 is forcibly shifted rightwardly to its differential "lock-out" position "B" against the biasing force of spring 81. With mode clutch collar 74 in its "B" position, its exterior splines 76 engage both interior splines 77 of forward carrier ring 78 and interior splines 112 of forward sun gear 82 thereby "locking out" dual planetary differential gear set 80. Thus, power flow from mode clutch collar 74 is coupled to both forward carrier ring 78 and forward sun gear 82. Therefore, forward and aft carrier rings 78 and 88, respectively, and forward sun gear 82 are "locked" against relative rotation. Since front wheel output shaft 148 is positively rotated by drive chain 144 at the same speed as rear wheel output shaft 54 there is no inter-axle differentiation and, as such, no viscous limited slip capabilities.

While the specific embodiments of the invention have been shown and described in detail to illustrate the principles of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as defined in the following claims.

What is claimed is:

1. In a transfer case adapted for driving a four wheel drive motor vehicle having front and rear ground engaging wheels, said transfer case including a housing, an input shaft adapted to be rotatably driven by a drivetrain of the motor vehicle, a first output shaft supported for rotation in said housing for driving connection to the rear ground engaging wheels, a second output shaft supported for rotation in said housing for driving connection to the front ground engaging wheels, a dual-planetary differential gear assembly adapted for proportioning torque between said first and second output shafts, said dual-planetary differential gear assembly including first and second longitudinally spaced carrier rings rotatable about a central axis of said first output shaft, said first carrier ring having a central opening formed with internal splines concentrically disposed about said first output shaft, first and second juxtaposed tooth sun gears concentrically disposed about said first output shaft, said first sun gear fixed for rotation with said first output shaft and having its teeth at a first radius from said central axis, said second sun gear journally supported on said first output shaft and having its teeth at a second radius from said central axis at a predetermined distance less than said first sun gear radius, drive means for connecting said second sun gear with said second output shaft, a first set of planet gears rotatably supported on a first set of pins between said first and second carrier rings at a first radial distance outward from said central axis, a second set of planet gears rotatably supported on a second set of pins disposed parallel to said central axis between said first and second carrier rings at a second radial distance outward from said central axis, said first and second planet gears having identical uniform diameters and wherein said first radial distance is a predetermined greater distance than said second radial distance, said first set of planet gears adapted to meshingly engage said first sun gear while forming a predetermined radial clearance with said second sun gear, said second set of planet gears adapted to meshingly engage said second sun gear, said first and second sets of planet gears disposed in paired relation such that each of said first planet gears meshingly engages a corresponding one of said second set of planet gears, said first sun gear having a predetermined number of teeth greater than the number of geared teeth on said second sun gear, a mode sleeve having external splines formed thereon being axially movable relative to said dual-planetary differential gear assembly between a first position wherein its external splines slidably engage said first carrier ring internal splines and a second position wherein said mode sleeve external splines engage said first carrier ring internal splines and internal splines formed on said first sun gear, and clutch means operative for moving said mode sleeve to said second position, an improvement comprising;

return spring means interposed between said first sun gear and said mode sleeve operative for biasing said mode sleeve to said first position, wherein when said mode sleeve is in said first position differentiation is provided by said dual-planetary differential gear assembly between said first and second output shafts such that drive torque supplied to said input shaft is divided between said first and second output shafts in a ratio proportional to the number of teeth on said respective first and second sun gears, and when said mode sleeve is in said second position said dual-planetary differential gear set is placed in a locked-up condition with no differentiation provided between said first and second output shafts; and a limited slip viscous coupling apparatus incorporated with said dual-planetary differential gear assembly for limiting slip between said first and second output shafts, said viscous coupling apparatus having inner and outer radially spaced drum housings concentrically surrounding said dual-planetary differential gear assembly so as to define a sealed viscous fluid annular chamber therebetween, said inner drum housing having interior gear teeth formed on an inner surface meshingly engaging each of said first set of planet gears, said inner drum housing having splines formed on an outer surface adapted to engage a first plurality of viscous clutch plates, said outer drum housing having splines formed on an inner surface adapted to engage a second plurality of viscous clutch plates which are alternately interleaved with said first plurality of viscous clutch plates, seal means provided between said inner and outer drum housings for providing a sealed relatively rotational junction therebetween such that said first and second plurality of clutch plates are immersed in a viscous fluid confined within said chamber, said outer drum housing being fixedly attached to said drive means, whereby when said mode sleeve is in said first position said first and second plurality of interleaved plates are operable to provide limited viscous slip differentiation between said first and second output shafts.

2. The transfer case of claim 1 further comprising an intermediate sleeve formed with external spline means concentrically surrounding said first output shaft for relative rotation therewith said clutch means comprising a range clutch collar concentrically surrounding a first portion of said intermediate sleeve and having internal spline means slidably engaging said intermediate sleeve external spline means such that said range clutch collar is adapted to selectively connect said input shaft to said intermediate sleeve via gear reduction means said gear reduction means being rotatively driven by a third sun gear integrally formed with said input shaft and having a first operating range for directly driving said first output shaft with no speed reduction, a second operating range wherein no driving torque is transferred from said input shaft to said first output shaft via said intermediate sleeve, and a third operating range wherein said gear reduction means drives said first output shaft with a speed reduction, and wherein when said range clutch collar is in said first and second operating range positions said return spring means biases said mode sleeve to said first position, and wherein when said range clutch collar is selectively shifted to said third operating range position said range clutch collar engages said mode sleeve for axially moving said mode sleeve against the biasing force said return spring means to said second position.

3. The transfer case of claim 2 wherein said drive means includes a first sprocket fixedly supported for rotation on said second sun gear, a chain driven by said first sprocket for driving a second sprocket connected to said second output shaft, said first sprocket fixedly coupled to said outer drum housing such that said outer drum housing is rotatably driven thereby.

4. The transfer case of claim 3 wherein said inner drum housing has a radially outwardly extending annular end flange supporting a first seal member for providing a sealed relatively rotational juncture with said inner surface of said outer drum housing, and said outer drum housing having a radially inwardly extending annular flange supporting a second seal member for providing a sealed relatively rotational juncture with said inner wall portion of said inner drum housing.

5. A vehicle transfer case having an input shaft adapted to be rotatably driven about a central axis and first and second outputs operatively driven by said input for rotatively driving first and second axles, respectively, the transfer case comprising:
a transfer case housing;
said input shaft rotatably supported within said housing along said central axis;
an input sun gear of a forward speed reduction gear set operatively connected to said input shaft to rotate therewith;
a central shaft rotatably supported within said housing along said central axis, said central shaft having its front end disposed adjacent an aft end of said input shaft and having its aft end constituting said first output of said transfer case;
an intermediate sleeve formed with external spline means concentrically surrounding said central shaft for relative rotation therewith;
a range clutch collar concentrically surrounding a forward portion of said intermediate sleeve and having internal spline means slidably engaging said intermediate sleeve external spline means such that said range clutch collar being adapted to selectively drivingly connect said input shaft to said intermediate sleeve via said forward speed reduction gear set;
said forward speed reduction gear set being rotatively driven by said input sun gear and having a first operating range for directly driving said first output with no speed reduction, said forward speed reduction gear set having a second operating range wherein no driving of said central shaft is provided, said forward speed reduction gear set having a third operating range for driving said first output with speed reduction;
an aft dual-planetary differential gear set disposed concentrically about said central shaft, said aft differential gear set comprising a dual-planetary carrier including forward and aft axially spaced interconnected carrier rings rotatable about said central axis, said forward carrier ring having a central internally splined opening concentrically disposed about an aft portion of said intermediate sleeve;
said aft differential gear set having forward and aft juxaposed sun gears intermediate said carrier rings and concentrically disposed about said central shaft, said forward sun gear being fixed to said central shaft and having its teeth at a first uniform radius, said aft sun gear journally supported on said central shaft and having its teeth at a second uniform radius a predetermined distance less than said forward sun gear teeth first radius, said forward sun gear having a forwardly facing annular recess formed with internal splines axially aligned with and adjacent to said forward carrier ring central opening internal splines;
sets of first and second planet gears having identical uniform diameters and which are rotatably supported on first and second, respective, sets of pins disposed parallel to said central axis, said first and second sets of pins journaled between said carrier forward and aft rings at first and second radial distances, respectively, outward from said central axis, wherein said first radial distance is a predetermined distance greater than said second radial distance, the teeth of each of said first planet gears extending a first predetermined axial distance substantially equal to the axial extent of both said forward and aft sun gear teeth, the teeth of each of said first planet gears positioned in meshing engagement with said forward sun gear teeth while forming a predetermined radial clearance with said aft sun gear teeth, the teeth of each of said second planet gears extending a second longitudinal distance about one-half the axial extent of said first planet gear teeth so as to be substantially equal to the axial extent of said aft sun gear teeth and in meshing engagement with said aft sun gear teeth, said sets of first and second planet gears disposed in paired relationship such that each of said first planet gear teeth is in meshing engagement with a corresponding second planet gear teeth;

said aft sun gear having a rearward tubular extension journaled on said central shaft and fixedly supporting thereon a first sprocket gear, a chain driven by said first sprocket gear in turn adapted to drive a second sprocket gear operatively connected to said second output;

a mode sleeve concentrically surrounding said aft end of said intermediate sleeve and axially moveable between a first position and a second position, said mode sleeve having internal splines engaging said intermediate sleeve external splines and said mode sleeve having external splines engaging said forward carrier ring central opening internal splines;

return means interposed between said forward sun gear and said mode sleeve for operatively biasing said mode sleeve toward said first position and into engagement with stop means such that said mode sleeve external splines are in engagement solely with said forward carrier member internal splines when said range clutch collar is in said first and second operating ranges, and whereby upon said range clutch collar being shifted rearwardly toward said third driving range its aft end contacts said mode sleeve for moving said mode sleeve to said second position against the force of said return means whereby said mode sleeve external splines engage both said forward carrier ring and said forward sun gear internal splines providing four wheel locked differential drive operation;

inner and outer radially spaced drum housings concentrically surround said aft planetary gear set, said inner drum housing having internal annulus gear teeth formed on its inner surface engaging teeth of said first planet gears, said inner drum housing having axially extending splines formed on its outer surface engaged with a plurality of inner clutch plates, said outer drum housing having axially extending splines formed on its inner surface engaged with a plurality of outer clutch plates alternately interleaved with said plurality of inner clutch plates;

said inner drum housing having a radially outwardly extending end annular flange on its forward end providing a sealed relatively rotational juncture with said outer drum housing, said outer drum housing having a radially inwardly extending annular flange on its aft end providing a sealed relatively rotational juncture with the aft end of said inner drum housing, whereby a sealed annular chamber is defined between said inner and outer drums with said inner and outer clutch plates being immersed in the viscous fluid confined within said chamber;

said outer drum housing annular aft flange being fixedly attached to said first drive sprocket gear whereby when said mode clutch collar is in said first position said inner and outer interleaved clutch plates will provide limited viscous slip differentiation between said first and second outputs.

6. A transfer case apparatus especially adapted for driving a four wheel drive motor vehicle having front and rear ground engaging wheels, said transfer case including a housing, an input shaft adapted for connection to a transmission of a motor vehicle, a first output shaft aligned on a longitudinal axis of said input shaft and having a pilot end portion formed on its forward end journally supported for rotation in an axial counter bore formed in the aft end of said input shaft, said first output shaft having its forward end supported for rotation in said housing and drivingly connected to said rear ground engaging wheels, a second output shaft supported for rotation in said housing and drivingly connected to said front ground engaging wheels, said input shaft forming an integral sun gear having external gear teeth and which is operatively associated with a planetary high and low range gear reduction assembly, an intermediate sleeve concentrically surrounding said first output shaft for relative rotation therewith, a range clutch having internal and external splines formed thereon for selectively shifting said gear reduction assembly between said high and low range positions, said range clutch collar internal splines slidably engaged with external splines formed on one end of said intermediate sleeve, a mode sleeve having internal splines slidably engaged with external splines adjacent the other end of said intermediate sleeve, a dual planetary differential gear assembly comprising fore and aft axially spaced carrier rings rotatable about said principal axis of said first output shaft, first and second juxtaposed toothed sun gears concentrically disposed about said first output shaft, said first sun gear fixed to said first output shaft having its teeth at a first uniform radius, said second sun gear journally supported on said first output shaft and having its teeth at a second uniform radius a predetermined distance less than said first radius, drive means interconnecting said second sun gear with said second output shaft, first and second sets of toothed planet gears having identical uniform diameters and which are rotatably supported on first and second sets of axially extending pins, respectively, between said fore and aft carrier rings, said first and second set of pins journaled between said fore and aft carrier rings at first and second radial distances outward from said central axis whereby said first radial distance is a predetermined distance greater than said second radial distance, the teeth of said first set of planet gears meshingly engaging said first sun gear teeth while forming a predetermined clearance with said second sun gear teeth, said teeth of each of said second set of planet gears adapted to meshingly engage said second sun gear teeth, said first and second sets of planet gears disposed in paired relation such that each of said first set planet gear teeth is in mating engagement with a corresponding second set planet gear teeth, said first carrier ring having an internally splined opening concentrically disposed about said first output shaft, said first sun gear having an annular recess therein formed with internal splines axially aligned with and adjacent to said first carrier ring internal splines, said mode sleeve having external splines engageable with said fore carrier ring interior splines and said first sun gear internal splines, an improvement comprising:

return spring means interposed between said first sun gear and said mode sleeve operative to bias said mode sleeve forwardly a predetermined distance into engagement with stop means defining a first position wherein said mode sleeve external splines are in engagement solely with said first carrier member internal splines such that differentiation is provided by said dual-planetary differential gear assembly between said first and second output shaft, said dual-planetary differential gear assembly is operable for dividing torque between said first and second output shafts in a ratio proportion to the number of teeth on said first and second sun gears, and wherein upon said range clutch collar being selectively shifted to said low-range position said range clutch collar forcibly axially moves said mode sleeve against the biasing of said return spring means until said mode sleeve external splines engage both said first sun gear internal splines and said first carrier ring internal splines wherein said dual-planetary differential is placed in a lock-up condition with no differentiation provided between said first and second output shafts whereby said transfer case is operating in a four wheel drive low lock-up condition; and means for limiting slip between said first and second output shafts when said mode sleeve is biased to said first position, said means for limiting slip including an inner drum housing having annulus gear teeth meshingly engaged with said first set of planet gears so as to be rotatably coupled to said first output shaft, and an outer drum housing coupled to said drive means so as to be rotatably coupled to said second output shaft, said inner and outer drum housings forming an annular chamber and having sealing means for providing a sealed relatively rotational juncture therebetween, said inner drum housing adapted to rotatably drive or be driven by a first set of clutch plates confined within said annular chamber and said outer drum housing adapted to rotatably drive or be driven by a second set of clutch plates alternately interleaved with said first set of clutch plates, said first and second clutch plates being immersed in a viscous fluid in said chamber whereby with said mode clutch in said first position said inner and outer interleaved clutch plates provide limited viscous slip differentiation between said first and second outputs.

7. The transfer case of claim 6 wherein said mode sleeve is in said first position when said range clutch is selectively positioned in either of a high range position or a neutral position for providing limited viscous slip differentiation.

8. The transfer case of claim 6 wherein said stop means is formed on a portion of said intermediate sleeve external splines for inhibiting forward axial sliding movement of said mode sleeve.

* * * * *